Oct. 11, 1949.　　　　　J. M. FOLZ　　　　　2,484,279
METHOD AND APPARATUS FOR TESTING CORROSION
Filed June 11, 1945
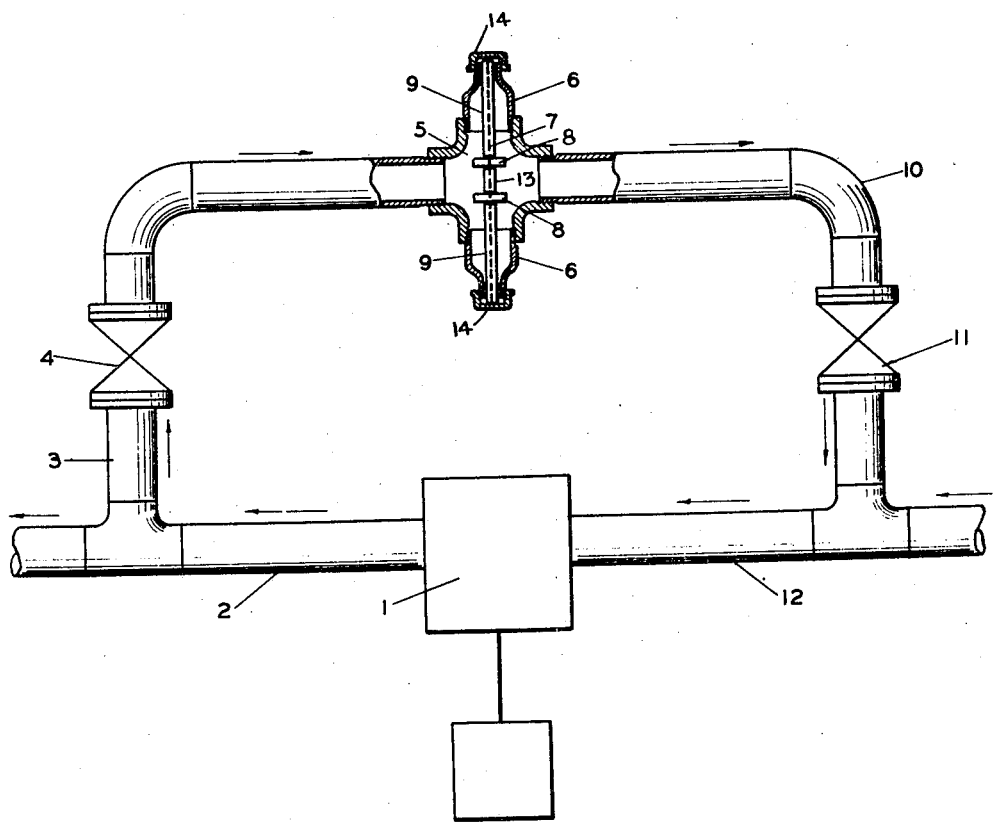
INVENTOR
J. M. FOLZ
BY Hudson & Young
ATTORNEYS Patented Oct. 11, 1949

2,484,279

UNITED STATES PATENT OFFICE 2,484,279

METHOD AND APPARATUS FOR TESTING CORROSION

John M. Folz, Borger, Tex., assignor to Phillips Petroleum Company, a corporation of Delaware Application June 11, 1945, Serial No. 598,737

9 Claims. (Cl. 73—86)

This invention relates to methods and apparatus employed in testing for corrosion. In one of its more specific aspects it relates to apparatus in which a branch of the process stream is utilized for exposing the test specimen. In another specific aspect it relates to methods and apparatus in which electrolytic action on the test specimen is minimized.

One object is to provide a method for testing for corrosion.

Another object is to provide apparatus for testing for corrosion.

Another object of this invention is to provide an apparatus and method for testing the corrosion and/or erosion resistance characteristics of various solid materials which come in contact with corrosive or erosive liquids during use, under conditions actually or approximately equivalent to the conditions encountered in use by permitting liquids used in actual plant operation to come in contact with and act upon specimens in a special manner herein disclosed, the apparatus being adapted to the introduction and withdrawal of specimens without interference with plant operation.

A further object is to avoid the errors introduced into the determination of corrosion and/or erosion resistance by electrolytic corrosion while permitting the simultaneous testing of a plurality of specimens.

A further object of this invention is to permit the liquids in actual plant use to come in contact with and act upon the test specimens without inserting apparatus or test specimens into the process stream. While the usual test is to the corrosiveness of the liquid, in some embodiments the test may be of the resistance to corrosion of the test piece to a fluid of standard corrosiveness.

Numerous other objects and features of novelty will be either specifically pointed out or will be apparent to those skilled in the art, upon reference to the accompanying specification, claims, and drawings, which describe and show an illustrative embodiment of this invention.

Heretofore corrosion-erosion resistance properties of materials employed in various commercial adaptations have been tested by the removal of portions of liquid from the process stream and immersion of the test specimens in such liquid, or by placing such liquids and test specimens in special apparatus intended to simulate the conditions of the plant process, or by the introduction of a single rod shaped test specimen into the process stream through a valve, with subsequent removal and examination or weighing of the test specimens. Such methods often prove very unsatisfactory because the conditions under which the test is conducted may vary widely from those of actual plant operation, electrolytic corrosion may introduce errors into the determination and the introduction of test specimens into the process stream may upset a delicately balanced operation such as the solvent extraction of unsaturated hydrocarbons with furfural.

It has been found that these and other disadvantages of prior testing procedures may be overcome by the practice of my invention.

The drawing is a schematic view with parts in section of apparatus embodying my invention.

The preferred arrangement of the apparatus is illustrated diagrammatically by the drawing. At or near the outlet side of a pump 1, which impels the process stream through a conduit 2 a smaller bypass conduit 3 is mechanically connected. Conduit 3 contains a valve 4 and leads to a chamber 5. Chamber 5 is shown closed by two mechanical closures 6 which are mechanically connected to an electrical nonconducting supporting member 7. Member 7 supports the test specimens 8 and nonconducting spacing members 9 and 13.

Member 7 may be any shape in cross section and its proportions may vary widely, but preferably 7 may be a slender tube or rod of some electrical non-conducting material non-corrosive in the particular fluid employed. The test specimen may be of any desired shape such as a U shaped but preferably may be a thin washer, and of course is made of the material (which may or may not be metallic) that it is desired to test or that is suitable to test the corrosiveness of the fluid or both. The spacing members 9 may be of any shape and may be made integral with member 7 or may be U shaped but preferably may be short sections of tubes of some material which is electrical non-conducting and is non-corrosive in the fluid employed. The rod or tube supports and washer test specimens shown give superior results and do not become disassembled. They are more easily assembled and more easily cleaned and handled than other forms. A conduit 10 which contains a valve 11 is connected from the chamber 5 to the conduit 12 through which the process stream flows at or near the intake side of the pump 5. When two or more specimens 8 are employed they may be held apart by electrically non-conducting spacing members such as tube 13. Mechanical closures or nipples 6 may be provided with screw cover caps 14.

While in the preferred embodiment described the electrically non-conducting supporting member 7 is mechanically surrounded by and supported by the closures 6 such arrangement is not the only one that may be used. It is obvious that member 7 may be installed in any manner which provides for convenient removal and replacement of the test specimens and separating members when the closure is opened, without departing from the spirit of the invention. While an enlarged chamber 5 is preferable to reduce the velocity of the fluid and allow ample room for manipulation of the specimens, which may be disposed on several racks inside the chamber, it is obvious that a mere cross connection of the same size pipe as the bypass conduit may be employed. In the drawing is shown my preferred embodiment which is advantageous in its simplicity of parts and secure retention of the parts so that no loose parts can be lost in the pumping system.

*Operation*

In operation the valves 4 and 11 are closed, the mechanical closures 6 are opened, a plurality of test specimens 8 are placed on the nonconducting supporting member 7 separated from each other and the walls of the chamber 5 by the nonconducting separating members 9. The mechanical closures are then closed holding the supporting member in place. The valves 4 and 11 are then opened and fluid from the process stream is forced by the pump through the conduit 3 into the chamber 5 where said fluid comes into contact with and acts upon the test specimens 8 and is returned to the process stream through conduit 10.

To disassemble the apparatus shown in the drawings, close valves 4 and 11, unscrew the upper mechanical closure or nipple 6 from cross fitting 5, and fish out central rod 7, with concentric disks 8 and tubes 9. If they do not come out easily lower nipple 6 can be unscrewed from 5 and then the parts 7, 8, 9 and 13 may be removed by gravity. The assembly is in reverse order, and rod 7 and related parts are held between the two nipples 6.

After exposure to the action of the fluid from the process stream for a desired length of time the valves 4 and 11 are closed and the closures 6 are opened. The test specimens are then removed for examination or weighing.

It is obvious that the shape and arrangement of the chamber 5 may be varied without departing from the principle of this invention, one or more mechanical closures may be used and the supporting member 7 may be mechanically attached to one or more of such closures. Numerous other changes in shape and proportion of parts and general arrangement of piping may be made, and in some embodiments the test sample may be placed in the main product stream, all without departing from the spirit of the invention as defined by the following claims:

Having described my invention, I claim:

1. A test sample assembly for a corrosion testing apparatus comprising in combination a first non-corrosive electrical non-conducting member adapted to receive corrosion testing samples threaded thereon, and a second non-corrosive electrical non-conducting member threaded on said first member between said corrosion testing samples whereby electrolytic action between said samples is substantially eliminated.

2. A corrosion testing apparatus comprising in combination a container, a first non-corrosive electrical non-conducing member adapted to receive corrosion testing samples threaded thereon, means supporting said first member in said container and a second non-corrosive electrical non-conducting member threaded on said first member between said corrosion testing samples whereby electrolytic action between said samples and said container is substantially eliminated.

3. A system for testing corrosion samples comprising in combination a first conduit containing a fluid material the corrosion of which is to be tested, a pump in said conduit for moving said fluid, a bypass conduit connected to said first conduit on each side of and bypassing said pump, said bypass conduit having a chamber, a cut-off valve in said bypass conduit on each side of said chamber, and means for mounting corrosion samples in said chamber.

4. A system for testing the corrosion and/or erosion characteristics of a fluid comprising in combination a first conduit containing said fluid, a pump in said conduit for moving said fluid, a bypass conduit connected to said first conduit on each side of and bypassing said pump, said bypass conduit having a chamber equipped for mounting a non-corrosive, electrically non-conducting supporting member on which solid test specimens are exposed to the action of said fluid, and a cut-off valve in said bypass conduit on each side of said chamber, non-corrosive electrically non-conducting separating members between each of the said test specimens and between each of the outermost of said test specimens and the wall of said chamber.

5. Means for suspending corrosion testing samples in a vessel comprising in combination a non-electrically conducting rod adapted to pass through holes in said samples and non-electrically conducting spacing sleeves threaded on said rod to maintain said samples out of electrical contact with said vessel and means on said vessel for supporting said rod, sleeves and samples in assembled relation.

6. The method of sampling the corrosive properties of a process stream containing a pump, without any interruption of said process stream, comprising in combination the steps of taking off a side stream from said process stream at the outlet side of said pump, suspending corrosion testing samples in said side stream, returning said side stream to the inlet side of said pump, and examining said samples by shutting down said side stream from time to time without ever interrupting said process stream.

7. Apparatus for testing the corrosiveness of fluid flowing in a conduit by the exposure of a metal test sample to said fluid comprising in combination a branch line adapted to be connected at one end to receive a portion of said fluid from said conduit and adapted to be connected at the other end to discharge said portion of fluid to said conduit at a lower pressure, a chamber comprising a cross fitting connected at opposite ends of said cross into said line to receive said portion of fluid, and closure means for the other ends of said cross chamber comprising reducing nipples, caps on the reduced ends of said nipples, a cut-off valve in said line on each side of said chamber, and a non-metallic testing sample rack for holding said sample in spaced relation to said line and said chamber comprising a support member for supporting said sample positioned by and removable with said closure means and sample spacing washers surrounding said member.

8. Apparatus for testing the corrosiveness of fluid flowing in a conduit by the exposure of a metal test sample to said fluid comprising in combination a branch line adapted to be connected at one end to receive a portion of said fluid from said conduit and adapted to be connected at the other end to discharge said portion of fluid to said conduit at a lower pressure, a chamber connected into said line to receive said portion of fluid, closure means for said chamber, a cut-off valve in said line on each side of said chamber, and a nonmetallic testing sample rack for holding said sample in spaced relation to said line and said chamber comprising a support member for supporting said sample positioned by and removable with said closure means and sample spacing washers surrounding said member.

9. Apparatus for testing the corrosiveness of fluid flowing in a conduit by the exposure of a metal test sample to said fluid comprising in combination a branch line adapted to be connected at one end to receive a portion of said fluid from said conduit and adapted to be connected at the other end to discharge said portion of fluid to said conduit at a lower pressure, a chamber connected into said line to receive said portion of fluid, closure means for said chamber, a cut-off valve in said line on each side of said chamber, and a non-metallic testing sample rack for holding said sample in spaced relation to said line and said chamber comprising a support member for supporting said sample positioned by and removable with said closure means.

JOHN M. FOLZ.

REFERENCES CITED

The following references are of record in the file of this patent:

UNITED STATES PATENTS

| Number | Name | Date |
| --- | --- | --- |
| 1,467,084 | Bassett | Sept. 4, 1923 |
| 1,601,383 | Todd | Sept. 28, 1926 |
| 1,769,463 | Rice | July 1, 1930 |
| 2,059,961 | Richley | Nov. 3, 1936 |
| 2,274,541 | Fontana et al. | Feb. 24, 1942 |
| 2,283,955 | Schroeder | May 26, 1942 |
| 2,328,853 | Sherrard | Sept. 7, 1943 |